A. A. SMITH.
AUTOMOBILE TIRE REMOVER.
APPLICATION FILED AUG. 4, 1919.

1,353,078.

Patented Sept. 14, 1920.
2 SHEETS—SHEET 1.

Inventor:
Arthur A. Smith

A. A. SMITH.
AUTOMOBILE TIRE REMOVER.
APPLICATION FILED AUG. 4, 1919.
1,353,078.
Patented Sept. 14, 1920.
2 SHEETS—SHEET 2.
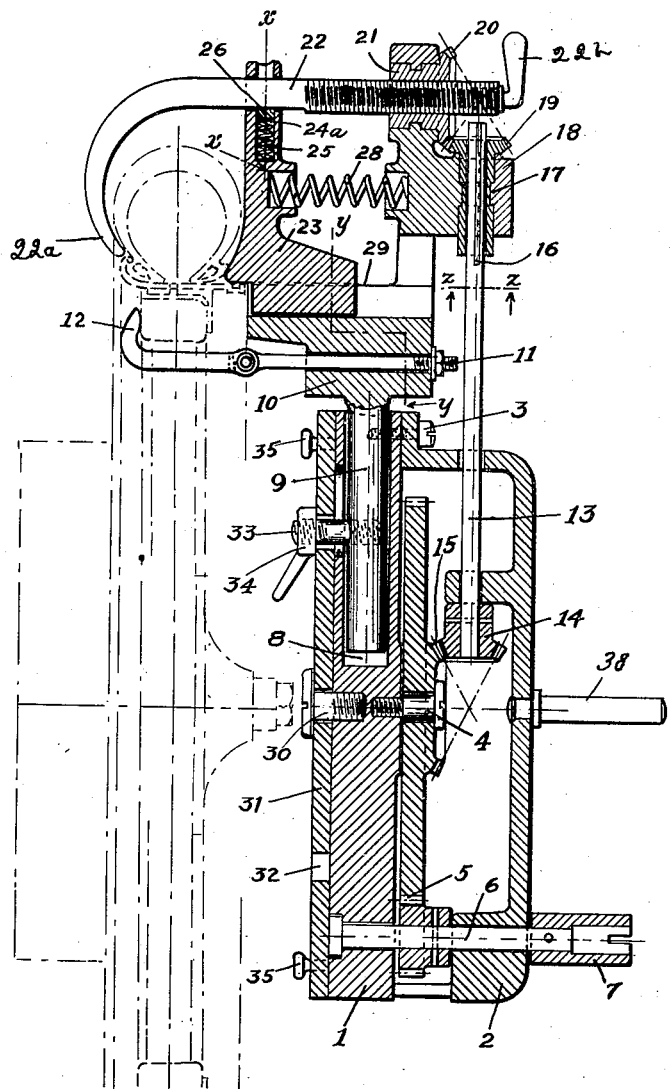
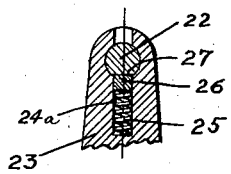
Fig. 5
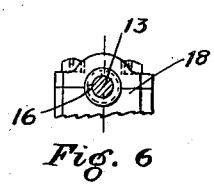
Fig. 6
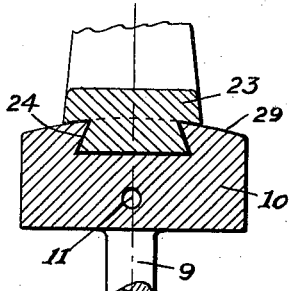
Fig. 7
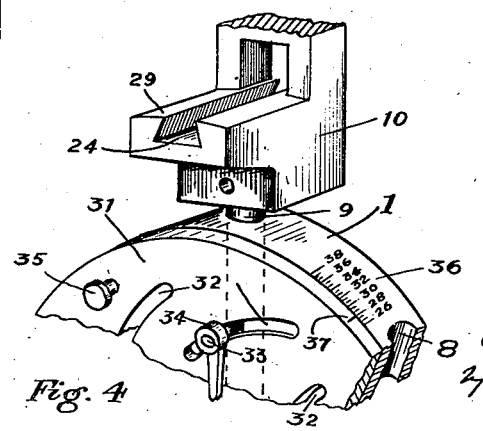
Inventor.
Arthur A. Smith
by Edgar le Vernis
attorney

UNITED STATES PATENT OFFICE.

ARTHUR A. SMITH, OF PORTLAND, MAINE.

AUTOMOBILE-TIRE REMOVER.

1,353,078.  Specification of Letters Patent.  Patented Sept. 14, 1920.

Application filed August 4, 1919. Serial No. 315,092.

*To all whom it may concern:*

Be it known that I, ARTHUR A. SMITH, a citizen of the United States, residing at Portland, in the county of Cumberland and State of Maine, have invented certain new and useful Improvements in Automobile-Tire Removers, of which the following is a specification.

This invention relates to improvements in auto tire removers. It is especially designed for tires used on detachable or demountable rims. It is designed to remove the shoe from the rim and is especially useful in many cases when the bead is held firmly in the flange on the opposite side, after the ring and flange on one side have been removed.

Its object is to provide a series of lugs or hooks adapted to engage the shoe at points around its body on one side thereof and then simultaneously forcing the lugs or hooks laterally against the shoe, thus forcing the shoe at all points off the rim.

Figure 1:
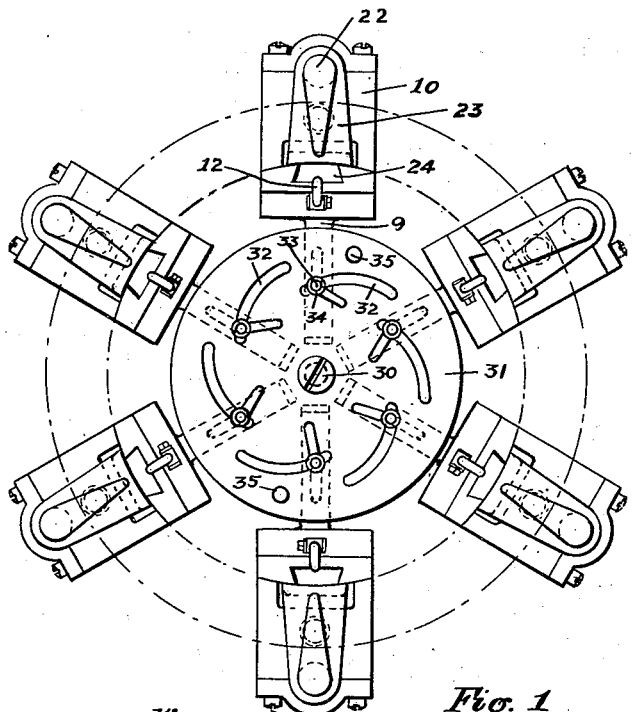
Figure 2:
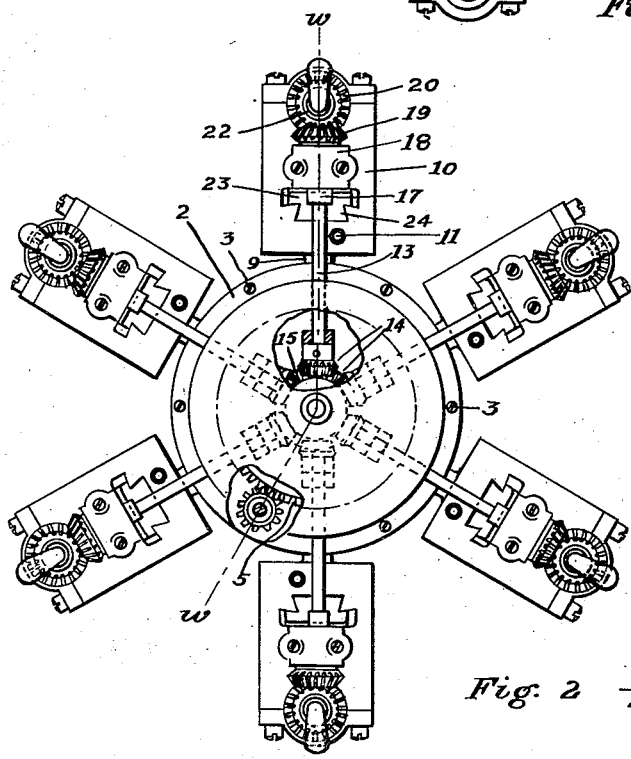

In the drawings herewith accompanying and forming a part of this application, Figure 1 is an inside elevation of my improved auto tire remover; Fig. 2 is an outside eletion of the same, parts being removed to disclose interior mechanisms; Fig. 3 is a sectional view taken on line $w$—$w$, Fig. 2, showing also a diagrammatic section of a wheel and tire; Fig. 4 is a detail in perspective of parts of the base and head for the adjusting parts; Fig. 5 is a sectional view taken on line $x$—$x$, Fig. 3; Fig. 6 is a horizontal sectional view taken on line $z$—$z$, Fig. 3, looking in the direction of the arrows, and Fig. 7 is a sectional view taken on line $y$—$y$, Fig. 2.

The same reference characters indicate like parts in the several figures.

It is noted that there is a series of tire engaging lugs and mechanisms for operating them, all substantially alike and one only will be described, it being understood that the same description will apply to each of the series.

In said drawings 1 is a base or body of the tool and 2 is a cap or housing secured thereto by screws 3. Pivotally mounted on a shaft 4 in the base is a gear wheel 5 located inside said housing. Mounted in the base and housing is a power shaft 6 terminating in a handle or pulley 7 to which power may be applied for operating the machine. Mounted in radially positioned sockets 8 in the base are a series of reciprocating rods 9 carrying on their outer ends heads or bearings 10. In these heads are mounted rotatable rods 11 terminating in lugs or hooks 12 pivotally secured thereto, and these lugs are adapted to engage the felly or other fixed part of a wheel, or some stationary object, when desired. Mounted in the housing is a series of radially positioned rods 13, each having one end stepped in a beveled gear 14 meshing with a bevel gear 15 on the face of gear 5. The other or outer end of rod 13 extends through a feather 16 and thrust 17 in an extension 18 of the head 10. On its outer end is a beveled gear 19 meshing with beveled gear 20 on a rotatable bearing 21 in said extension. In threaded engagement with bearing 21 carrying beveled gear 20 is a lug bar 22 terminating in a lug 22ª adapted to be turned over and down into engagement with the inner side of a shoe or tire on the wheel and extending down to or near the clencher of the rim. Said lug bar has an operating handle 22ᵇ on its other end. Adapted to reciprocate upon the bearing 10 is a sliding guide 23 having tongue and groove engagement, as seen at 24, Fig. 7. This guide has at its top a socket 24ª, in which is a coil spring 25 carrying a friction plug 26, adapted to hold the lug bar 22 yieldingly when out of engagement, if desired. In certain cases the lug bar is provided with a flat surface 27, so that it will be more strongly held at such point by said spring and plug. Suspended between the extension 18 and the sliding guide 23 is a coil spring 28 holding the two parts 18 and 23 yieldingly apart. The range of the sliding guide should be sufficient to allow the shoe to be moved off the wheel on to the top 29 of the bearing 10. Pivotally mounted on a bearing 30 on the back of the base is a disk 31 provided with a series of grooves 32 arranged eccentric to its pivot center and adapted to receive a cam pin 33 carried by post 9, which pin has a threaded nut 34 on the outside thereof. The disk has one or more operating handles 35. On the periphery of the base is a scale 36 marked with a series of numbers indicating the measure or size of the tire, and the rotation of the disk relative to the base adjusts the head to fit tires of different sizes according as the indicator mark 37 on the disk registers with the number on the base. The housing carries a central post 38 by which it may be moved upon a carriage, if desired, for transportation.

I claim—

1. In a device of the character described, a base, a plurality of means for engaging one side of the tire of a wheel, a plurality of adjustable heads carried by said base, means carried by said heads for yieldingly engaging the other side of the tire, means for simultaneously moving the tire engaging means, whereby the tire is removed from the wheel, and means for adjusting the heads to fit tires of different sizes.

2. In a device of the character described, a base, a plurality of means for engaging a wheel, a plurality of means for engaging the tire of a wheel, a gear wheel pivotally attached to the base and adapted through intermediate mechanism to operate said tire engaging means, a series of posts mounted in said base and terminating in heads carrying wheel engaging means and said tire engaging means, a plate pivotally mounted upon the base and provided with eccentric slots, and pins mounted in said posts and extending into said slots, whereby rotation of the disk adjusts said heads.

In testimony whereof I affix my signature.

ARTHUR A. SMITH.